US012766858B2

(12) United States Patent
Nakamura et al.

(10) Patent No.: US 12,766,858 B2
(45) Date of Patent: Oct. 20, 2026

(54) MEDIUM PROCESSING DEVICE AND LIQUID APPLICATION SYSTEM

(71) Applicant: FUJIFILM Corporation, Tokyo (JP)

(72) Inventors: Hayate Nakamura, Kanagawa (JP); Takashi Mitsuyasu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 134 days.

(21) Appl. No.: 19/001,356

(22) Filed: Dec. 24, 2024

(65) Prior Publication Data

US 2025/0128522 A1 Apr. 24, 2025

Related U.S. Application Data

(63) Continuation of application No. PCT/JP2023/019309, filed on May 24, 2023.

(30) Foreign Application Priority Data

Jul. 25, 2022 (JP) ................................ 2022-118157

(51) Int. Cl.
*B41J 2/21* (2006.01)
*B41J 11/00* (2006.01)

(52) U.S. Cl.
CPC ........ *B41J 11/00242* (2021.01); *B41J 2/2114* (2013.01)

(58) Field of Classification Search
CPC . B41J 2/01; B41J 2/2114; B41J 2/2117; B41J 11/0015; B41J 11/002; B41J 11/0024; B41J 11/00124
See application file for complete search history.

(56) References Cited

U.S. PATENT DOCUMENTS 8,192,005 B2 6/2012 Law et al.
10,576,757 B2 * 3/2020 Nakamura ............. B41J 2/2117
(Continued)

FOREIGN PATENT DOCUMENTS

JP H06166174 6/1994
JP H09268483 10/1997
(Continued)

OTHER PUBLICATIONS

"International Search Report (Form PCT/ISA/210) of PCT/JP2023/019309," mailed on Jul. 18, 2023, with English translation thereof, pp. 1-5.
(Continued)

*Primary Examiner* — Anh T Vo
(74) *Attorney, Agent, or Firm* — JCIPRNET

(57) ABSTRACT

A medium processing device that suppresses adhesion of a liquid, with improved durability of a member that comes into contact with a medium after a drying treatment. The medium processing device includes: a drying device that performs the drying treatment on a medium; and a contact member that first comes into contact with a liquid adhering surface of the medium, after the drying treatment. The drying device performs the drying treatment so that a mass of a liquid per unit area on a liquid adhering surface of the medium is 200 $\mu g/cm^2$ or less. The contact member has a cooling structure. Bonding work of a contact surface that comes into contact with the liquid adhering surface with respect to a liquid applied region of the liquid adhering surface is 80 mN/m or less. Vickers hardness of the contact surface is 450 Hv or more and 600 Hv or less.

14 Claims, 9 Drawing Sheets

(56) References Cited

U.S. PATENT DOCUMENTS

| | | | | |
|---|---|---|---|---|
| 2005/0270351 | A1* | 12/2005 | Mouri | B41J 2/2117 347/103 |
| 2007/0172285 | A1 | 7/2007 | Izawa et al. | |
| 2012/0252942 | A1 | 10/2012 | Aoki et al. | |
| 2016/0167403 | A1 | 6/2016 | Toya et al. | |
| 2022/0089398 | A1 | 3/2022 | Hayashi | |

FOREIGN PATENT DOCUMENTS

| | | |
|---|---|---|
| JP | 2007196513 | 8/2007 |
| JP | 2011031615 | 2/2011 |
| JP | 2012214650 | 11/2012 |
| JP | 2016112727 | 6/2016 |
| JP | 2017146540 | 8/2017 |
| JP | 2018122525 | 8/2018 |
| JP | 2021154658 | 10/2021 |

OTHER PUBLICATIONS

"Written Opinion of the International Searching Authority (Form PCT/ISA/237) of PCT/JP2023/019309," mailed on Jul. 18, 2023, with English translation thereof, pp. 1-8.

"Search Report of Europe Counterpart Application", issued on Oct. 14, 2025, pp. 1-8.

* cited by examiner

FIG. 6

| SURFACE TREATMENT | SURFACE FREE ENERGY [mN/m] | BONDING WORK [mN/m] | HARDNESS [Hv] | WHITE SPOT EVALUATION | DURABILITY PERFORMANCE EVALUATION |
|---|---|---|---|---|---|
| ALUMITE | 50.1 | 94.2 | 250 | D | D |
| HARD CHROME PLATING | 70.0 | 109.5 | 1000 | D | A |
| ELECTROLESS NICKEL PLATING | 33.9 | 80.3 | 600 | C | A |
| PTFE COATING SUS | 18.5 | 59.4 | 310 | A | D |
| PTFE NICKEL PLATING | 24.5 | 68.3 | 450 | A | B |

FIG. 7

| SURFACE TREATMENT | SOLVENT AMOUNT [$\mu$g/cm$^2$] | WHITE SPOT EVALUATION | BLISTER EVALUATION |
|---|---|---|---|
| PTFE NICKEL PLATING | 300 | C | A |
| | 250 | B | A |
| | 200 | B | A |
| | 148 | A | A |
| | 105 | A | B |
| | 50 | A | C |
| ELECTROLESS NICKEL PLATING | 300 | D | A |
| | 250 | D | A |
| | 200 | C | A |
| | 148 | C | A |
| | 105 | B | B |
| | 50 | A | C |

MEDIUM PROCESSING DEVICE AND LIQUID APPLICATION SYSTEM

CROSS-REFERENCE TO RELATED APPLICATIONS

The present application is a Continuation of PCT International Application No. PCT/JP2023/019309 filed on May 24, 2023 claiming priority under 35 U.S.C § 119(a) to Japanese Patent Application No. 2022-118157 filed on Jul. 25, 2022. Each of the above applications is hereby expressly incorporated by reference, in its entirety, into the present application.

BACKGROUND OF THE INVENTION

1. Field of the Invention

The present invention relates to a medium processing device and a liquid application system.

2. Description of the Related Art

An ink jet printing device forms an image on a recording medium and then dries the image. The drying is for the purpose of volatilizing an ink adhered to the recording medium and reduces stickiness of the image. Even in a case where the drying is performed to a certain degree or more for the purpose of reducing the stickiness, immediately after a drying treatment, a temperature of a printing surface of the recording medium is close to a temperature of the drying treatment, and depending on a configuration of the printing device, the printing surface of the recording medium may come into contact with a member of the printing device during transportation of the recording medium. The recording medium is a medium used in printing, and examples thereof include a paper medium. The recording medium is referred to as a printing medium, printing paper, a printing sheet, a recording sheet, recording paper, and the like.

In a case where the printing surface of the printed recording medium comes into contact with the member of the printing device, a part of the image printed on the printing surface of the recording medium may be closely attached to the member, and the part of the image may be peeled off from the printing surface of the recording medium. In a case where an ink adheres to the member, an image defect in which the image is peeled off from the printing surface can frequently occur in the recording medium transported thereafter due to affinity between the ink adhered to the member and the ink constituting the image. In particular, an image in which a certain period of time has not elapsed since the drying treatment has a weak film quality on the surface, and adhesion of the ink is likely to occur at a member with which the image comes into contact within a certain period of time after the drying treatment.

Examples of the member with which the image comes into contact within a certain period of time after the drying treatment include a paper feed roller in a double-sided printing device using a recording medium of sheets and a cooling roller of a roll printer. Examples of a method of preventing an ink from adhering to the member of the printing device, which is a member coming into contact with the image, include coating of a surface of the member and cooling of the image.

Examples of the coating of the surface of the member include attachment of a contamination prevention film, fluororesin-based coating, and silicon coating. Examples of the cooling of the image include a water cooling method in which a cooling roller that circulates a refrigerant is brought into contact with the image and an air cooling method in which cold air is blown to the image. In a case where latex contained in an ink is cooled and a latex film is formed on a surface of the image, a film quality of the surface of the image is reinforced, and adhesion of the ink to the surface of the member is suppressed.

JP2021-154658A discloses an image forming system that forms an image on a first surface and a second surface of a recording medium. The device described in JP2021-154658A has a transport member in which surface energy of a portion that comes into contact with a surface of the recording medium, which is the first surface, is lower than surface energy of an ink forming the image on the surface. Examples of a material having low surface energy include fluororesin-based materials such as PTFE, ETFE, and FDTS resins.

PTFE is an abbreviation for poly tetra fluoro ethylene. ETFE is an abbreviation for ethylene tetra fluoro ethylene. FDTS represents 1H, 1H, 2H, and 2H-perfluorodecyltrichlorosilane.

JP2011-31615A discloses a printer that performs printing on a continuous web using an organic fixed phase transition ink. JP2011-31615A describes that an ink offset on an aluminum roller occurs in a case where an adhesion force between an ink image and the aluminum roller is stronger than a cohesive force of the ink itself. In addition, JP2011-31615A describes that the aluminum roller is maintained at a relatively low temperature of approximately 30° C. as a method of minimizing the ink offset. In addition, JP2011-31615A describes low viscosity coating and lipophobic coating.

SUMMARY OF THE INVENTION

In a case where the drying treatment is performed on the image after the image is printed, the film quality of the surface of the image is low immediately after the drying treatment. In particular, adhesion of the ink is most likely to occur at a first touch member that first comes into contact with the image after the drying treatment.

A coating on a surface of a member that comes into contact with the image suppresses the adhesion of the ink to the surface of the member, but the coating has a poor durability performance and has a short life. In the related art, the member is configured to be removable, and a coating treatment is regularly performed on the surface of the member to maintain a performance of preventing the adhesion of the ink or the like. However, regular performance of the coating treatment on the member is a problem in terms of work costs.

In a case where the member that comes into contact with the image is cooled, the air cooling method is inferior in cooling efficiency to the water cooling method, and the water cooling method having relatively high cooling efficiency is advantageous. On the other hand, in the water cooling method, it is difficult to remove the cooling roller due to the structure of the cooling roller.

That is, the member that comes into contact with the image such as the first touch member is required to have low surface bonding work, to have a property of being difficult to be contaminated, and to have a certain durability performance, and does not require regular replacement or requires regular replacement with a relatively low frequency.

In JP2021-154658A, there is no description related to the durability performance of the transport member to which a material having low surface energy is applied. In general, the coating of the fluorine-based material is insufficient in the durability performance of a member which comes into contact with the recording medium steadily. That is, the transport member to which the material having low surface energy described in JP2021-154658A is applied does not achieve both a performance of suppressing the adhesion of the image and the durability performance.

In the aluminum roller described in JP2011-31615A, material hardness is not specified. That is, the aluminum roller described in JP2011-31615A does not have measures against the durability performance. The above problems in the ink jet printing device can also exist in a medium processing device, in which there is a drying treatment after liquid application, in a liquid application system for applying a liquid to a medium.

The present invention has been made in view of such circumstances, and an object thereof is to provide a medium processing device and a liquid application system in which both suppression of adhesion of a liquid and a durability performance are realized in a member that comes into contact with a medium after a drying treatment.

A medium processing device according to a first aspect of the present disclosure is a medium processing device comprising a drying device that performs a drying treatment on a medium to which a liquid is applied and a contact member that first comes into contact with a liquid adhering surface of the medium subjected to the drying treatment using the drying device, to which the liquid is adhered, after the drying treatment, in which the drying device performs the drying treatment on the medium so that a mass of the liquid per unit area on the liquid adhering surface of the medium is 200 micrograms per square centimeter or less, the contact member has a cooling structure that cools the medium, bonding work of a contact surface that comes into contact with the liquid adhering surface with respect to a liquid applied region of the liquid adhering surface of the medium where the liquid is applied is 81 millinewtons per meter or less, and Vickers hardness of the contact surface is 450 Hv or more and 600 Hv or less.

According to the present aspect, for the contact member that first comes into contact with the liquid adhering surface of the medium after the drying treatment, the bonding work of the contact surface that comes into contact with the liquid adhering surface of the medium is set to 81 millinewtons per meter or less, and the adhesion of the liquid is suppressed. In addition, the Vickers hardness of the contact surface is set to 450 Hv or more and 600 Hv or less, and a certain durability performance is obtained. Accordingly, both the suppression of the adhesion of the liquid to the contact member and the durability performance are realized.

The medium processing device can comprise a transport device that transports the medium. A roller transport method in which one or more rollers that support the medium are comprised can be applied to the transport device. A transport method in which one or more support members having a surface for supporting the medium are comprised can be applied to the transport device.

The drying device can perform the drying treatment in which the mass of the liquid per unit area on the liquid adhering surface of the medium after the drying treatment is 105 micrograms per square centimeter or more.

The bonding work on the contact surface of the contact member is preferably 35 millinewtons per meter or more.

The contact member may be disposed inside the drying device or may be disposed outside the drying device.

According to a second aspect of the present disclosure, in the medium processing device according to the first aspect, the contact member may perform a eutectic plating treatment on the contact surface.

According to such an aspect, the contact surface of the contact member having the specified bonding work and the specified Vickers hardness can be realized by applying the eutectic plating treatment as a surface treatment of the contact member.

According to a third aspect of the present disclosure, in the medium processing device according to the first aspect or the second aspect, the contact member may perform a fluorine-based resin eutectic plating treatment on the contact surface.

According to such an aspect, the contact surface of the contact member having the specified bonding work and the specified Vickers hardness can be realized by applying the fluorine-based resin eutectic plating treatment as a surface treatment of the contact member.

According to a fourth aspect of the present disclosure, in the medium processing device according to the third aspect, a plating film on the contact surface of the contact member may contain a fluorine-based resin of 4.0 percent by mass or more and 9.0 percent by mass or less.

According to such an aspect, it is possible to optimize both the bonding work and the Vickers hardness.

According to a fifth aspect of the present disclosure, in the medium processing device according to any one of the first aspect to the fourth aspect, the contact member may have a roller shape.

According to such an aspect, a driven roller that is driven in accordance with movement of the medium is preferable as the contact member having a roller shape.

According to a sixth aspect of the present disclosure, in the medium processing device according to the first aspect to the fifth aspect, a method of circulating the liquid adjusted to be in a specified temperature range may be applied to the cooling structure.

According to such an aspect, the contact member having an excellent durability performance has a relatively low replacement frequency and a high cost of replacement work, but a method of circulating a liquid having an excellent cooling performance can be adopted.

According to a seventh aspect of the present disclosure, the medium processing device according to the sixth aspect may further comprise one or more processors and one or more memories in which a program executed by the one or more processors is stored. The one or more processors may be configured to execute a command of the program, and the liquid applied to the cooling structure may be adjusted to 25° C. or less.

According to such an aspect, the hardening of the liquid adhered to the medium is promoted, and the hardening of the liquid is preferably realized.

According to an eighth aspect of the present disclosure, the medium processing device according to the sixth aspect may further comprise one or more processors and one or more memories in which a program executed by the one or more processors is stored. The one or more processors may be configured to execute a command of the program, and cooling in which a temperature difference before cooling and after cooling becomes 60° C. or more may be performed on the liquid adhering surface cooled using the cooling structure.

According to such an aspect, the hardening of the liquid adhered to the medium is promoted, and the hardening of the liquid is preferably realized.

According to a ninth aspect of the present disclosure, the medium processing device according to the first aspect to the sixth aspect may further comprise one or more processors and one or more memories in which a program executed by the one or more processors is stored. The one or more processors may be configured to execute a command of the program, and a temperature after the drying treatment of the medium may be adjusted to 90° C. or more and 180° C. or less using the drying device.

According to such an aspect, insufficient drying and excessive drying are suppressed, and a drying state of the medium is optimized.

A liquid application system according to a tenth aspect of the present disclosure is a liquid application system comprising a liquid application device that applies a liquid to a liquid adhering surface of a medium, a drying device that performs a drying treatment on the medium having the liquid adhering surface to which the liquid is applied, and a contact member that first comes into contact with the liquid adhering surface of the medium subjected to the drying treatment using the drying device, to which the liquid is adhered, after the drying treatment, in which the drying device performs the drying treatment on the medium so that a mass of the liquid per unit area on the liquid adhering surface of the medium is 200 micrograms per square centimeter or less, the contact member has a cooling structure that cools the medium, bonding work of a contact surface that comes into contact with the liquid adhering surface with respect to a liquid applied region of the liquid adhering surface of the medium where the liquid is applied is 81 millinewtons per meter or less, and Vickers hardness of the contact surface is 450 Hv or more and 600 Hv or less.

The liquid application system according to the tenth aspect can obtain the same operational effects as those of the medium processing device according to the first aspect. Configuration requirements of the medium processing device according to the second aspect to the ninth aspect can be applied to the liquid application system according to the other aspects.

According to an eleventh aspect of the present disclosure, the liquid application system according to the tenth aspect may further comprise a moisture content adjusting device that is disposed on an upstream side of the liquid application device in a transport direction of the medium and that performs a moisture content adjusting treatment on the medium in a case of entering the liquid application device, one or more processors, and one or more memories in which a program executed by the one or more processors is stored. The one or more processors may be configured to execute a command of the program, and a moisture content of the medium in a case of entering the liquid application device may be adjusted to 1.2 percent or more and 14.3 percent or less using the moisture content adjusting device.

According to such an aspect, the moisture content of the medium in a case of entering the liquid application device is adjusted. Accordingly, optimization of the performance of the drying device is realized.

According to a twelfth aspect of the present disclosure, the liquid application system according to the tenth aspect or the eleventh aspect may further comprise a printing device that forms an image on the medium by applying an ink to the medium as the liquid application device. The ink may contain wax having a melting point of 90° C. or more.

According to such an aspect, an increase in stickiness of the hardened liquid is suppressed.

With the present invention, for the contact member that first comes into contact with the liquid adhering surface of the medium after the drying treatment, the bonding work of the contact surface that comes into contact with the liquid adhering surface of the medium is set to 81 millinewtons per meter or less, and the adhesion of the liquid is suppressed. In addition, the Vickers hardness of the contact surface is set to 450 Hv or more and 600 Hv or less, and a certain durability performance is obtained. Accordingly, both the suppression of the adhesion of the liquid to the contact member and the durability performance are realized.

BRIEF DESCRIPTION OF THE DRAWINGS

FIG. 6 is a table showing a performance of the cooling roller depending on a difference of a surface treatment.

FIG. 7 is a table showing evaluation results of a solvent amount on a substrate.

DESCRIPTION OF THE PREFERRED EMBODIMENTS

Hereinafter, a preferred embodiment of the present invention will be described in detail with reference to the accompanying drawings. In the following, a traveling direction of a substrate S will be referred to as a transport direction, and a direction orthogonal to the transport direction and parallel to a recording surface of the substrate S will be referred to as a width direction. The substrate described in the embodiment is an example of a medium.

[Configuration Example of Printing System]

Figure 1:
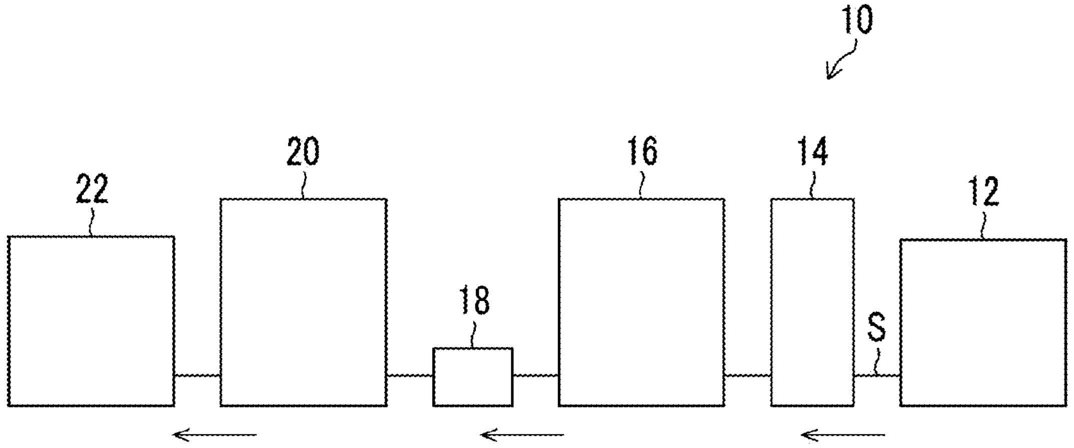
FIG. 1 is an overall configuration view of a printing system according to an embodiment.

FIG. 1 is an overall configuration view of a printing system according to the embodiment. A printing system 10 shown in the drawing is a printing system that transports the substrate S, which is a long paper medium, through a so-called roll-to-roll method and that forms an image through a single-pass method. The printing system 10 comprises a paper feeding unit 12, a preliminary drying unit 14, a front surface printing main drying unit 16, an inverting unit 18, a back surface printing main drying unit 20, and a paper discharging unit 22.

The paper feeding unit 12 stores a delivery roll around which the substrate S before printing is wound in a roll shape. The paper feeding unit 12 drives a motor connected to a rotation shaft of the delivery roll to rotate the delivery roll and supplies the substrate S before printing to a transport path for the substrate S. The substrate S supplied from the delivery roll is transported to the preliminary drying unit 14.

The delivery roll and the motor connected to the rotation shaft of the delivery roll are not shown.

The preliminary drying unit 14 comprises a preliminary drying transport device that transports the substrate S in the preliminary drying unit 14 and a heating device that heats the substrate S. The preliminary drying unit 14 adjusts the moisture content of the substrate S entering the front surface printing main drying unit 16. The preliminary drying transport device and the heating device are not shown. The preliminary drying unit 14 heats and preliminarily dries the transported substrate S.

As a method of a preliminary drying treatment on the substrate S, the preliminary drying unit 14 can apply at least any one of thermal conduction, convection, radiation, or dielectric heating. The substrate S discharged from the preliminary drying unit 14 is transported to the front surface printing main drying unit 16. The preliminary drying unit 14 described in the embodiment is an example of a moisture content adjusting device that performs a moisture content adjusting treatment on the medium in a case of entering a liquid application device.

The front surface printing main drying unit 16 comprises a front surface printing and transport device, a front surface printing device, and a front surface main drying device. The front surface printing and transport device transports the substrate S along the transport path for the substrate S in the front surface printing main drying unit 16.

Figure 2:
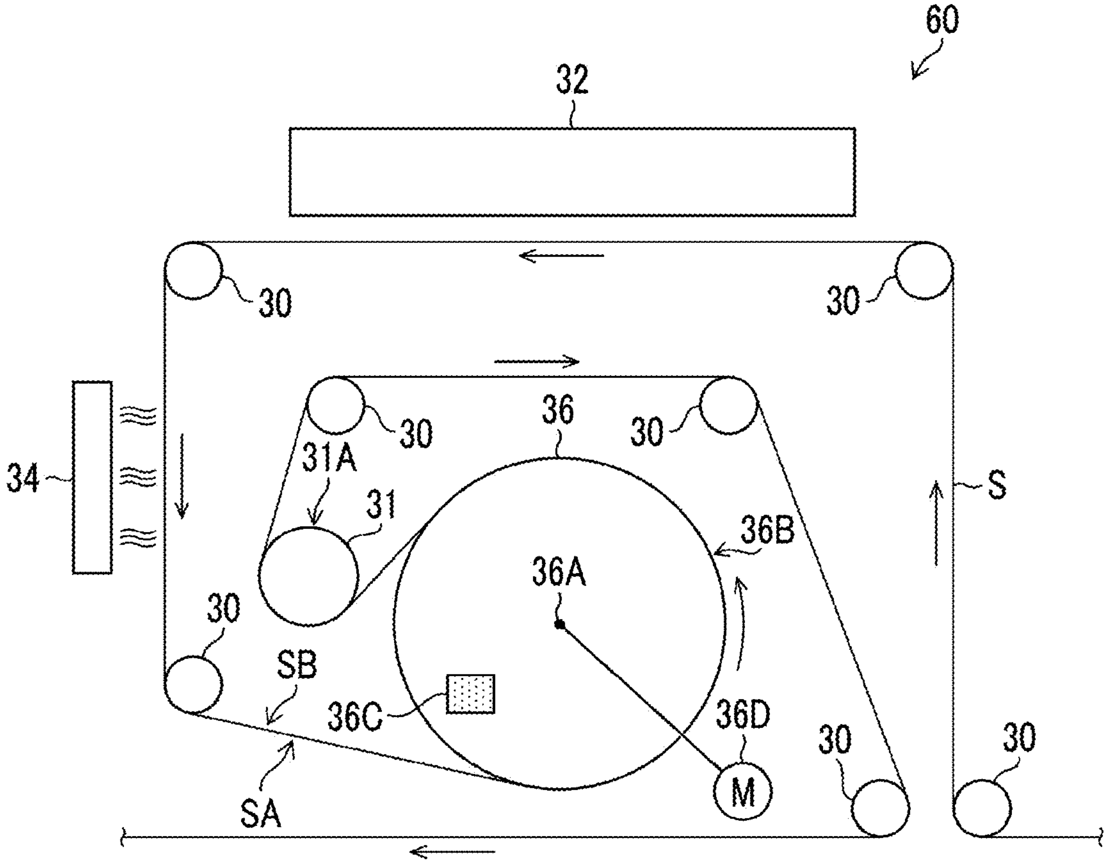
FIG. 2 is a configuration view showing a schematic configuration of a printing main drying unit shown in FIG. 1.

An ink jet method in which one or more ink jet heads are comprised is applied to the front surface printing device. The front surface printing device prints an image on a front surface of the substrate S by jetting liquid droplets of an aqueous ink from an ink jet head onto the substrate S transported along a specified transport path. The front surface of the substrate S is shown in FIG. 2 using a reference symbol SA.

The front surface main drying device dries the applied aqueous ink of the substrate S. The configuration of the front surface main drying device is shown in FIG. 2. The same drying treatment method as in the preliminary drying unit 14 may be applied to the front surface main drying device. The substrate S discharged from the front surface printing main drying unit 16 is transported to the inverting unit 18. In FIG. 1, the front surface printing and transport device, the printing device, and the main drying device are not shown. The front surface printing and transport device, the printing device, and the front surface main drying device are shown in FIG. 2.

The inverting unit 18 includes a turn bar. The turn bar inverts the front and back of the substrate S. The substrate S of which the front and back are inverted is transported to the back surface printing main drying unit 20. For example, in the front surface printing main drying unit 16, a printing surface of the substrate S on which an image is printed can be a front surface, and a support surface on which the substrate S is supported in the front surface printing main drying unit 16 can be a back surface. The front surface and the back surface described herein represent a relative relationship between one surface and the other surface of the substrate S. The back surface of the substrate S is shown in FIG. 2 using a reference symbol SB.

The same configuration as that of the front surface printing main drying unit 16 can be applied to the back surface printing main drying unit 20. The back surface printing main drying unit 20 transports the substrate S along a specified transport path using a back surface printing and transport device.

The back surface printing main drying unit 20 prints an image on the back surface, which is the printing surface of the substrate S, by jetting liquid droplets of an aqueous ink from the ink jet heads to the substrate S transported along the specified transport path using the back surface printing device.

The back surface printing main drying unit 20 dries an aqueous ink applied to the substrate S using a back surface main drying device. The substrate S discharged from the back surface printing main drying unit 20 is transported to the paper discharging unit 22.

The paper discharging unit 22 stores a delivery roll around which the printed substrate S is wound in a roll shape. The same configuration as that of the paper feeding unit 12 is applied to the paper discharging unit 22. The paper discharging unit 22 may comprise a cutter that cuts the substrate S in a continuous form and may store the cut single-sheet substrate. Hereinafter, each unit provided in the printing system 10 will be described in detail.

[Configuration Example of Printing Main Drying Unit]

The front surface printing main drying unit 16 and the back surface printing main drying unit 20 will be generally referred to as the printing main drying unit. The same configuration can be applied to the front surface printing main drying unit 16 and the back surface printing main drying unit 20. Herein, the front surface printing main drying unit 16 will be described as a printing main drying unit 60.

FIG. 2 is a configuration view showing a schematic configuration of the printing main drying unit shown in FIG. 1. The printing main drying unit 60 comprises a plurality of pass rollers 30, an ink jet head 32, a radiation heating unit 34, and a drying drum 36. The plurality of pass rollers 30 are components of the printing transport device, the ink jet head 32 is a component of the printing device, and the radiation heating unit 34 and the drying drum 36 are components of the main drying device.

The printing transport device is a general term for the front surface printing and transport device and the back surface printing and transport device, the printing device is a general term for the front surface printing device and the back surface printing device, and the main drying device is a general term for the front surface main drying device and the back surface main drying device.

The plurality of pass rollers 30 are disposed on the transport path for the substrate S in the printing main drying unit 60. The substrate S carried into the printing main drying unit 60 is supported using the pass rollers 30, is transported, and is discharged to the outside of the printing main drying unit 60. The plurality of pass rollers 30 may function as tension rollers that generate tension on the substrate S with one or more pass rollers 30. A tension pickup that detects the tension applied to the substrate S may be disposed on the transport path for the substrate S.

The ink jet head 32 is disposed at a position facing the front surface SA of the substrate S transported along the transport path for the substrate S. The ink jet head 32 jets an aqueous ink onto the front surface SA of the substrate S to print an image.

The printing device may comprise ink jet heads corresponding to a plurality of ink colors, respectively. That is, the printing device comprises a plurality of ink jet heads and can jet inks of different colors from the plurality of ink jet heads. Examples of the plurality of ink colors include cyan, magenta, yellow, and black. The ink jet head 32 that jets a special color ink such as white and clear may be provided.

A line head in which a plurality of nozzles are disposed over a length corresponding to the entire width of the substrate S in the width direction orthogonal to the transport direction of the substrate S is applied to the ink jet head 32. The single-pass method in which the substrate S and the ink jet head 32 are relatively scanned once to print an image on the entire surface of the substrate S can be applied to the printing device.

A configuration where a plurality of head modules are linked to each other in the width direction of the substrate S can be applied to the ink jet head 32. As disposition of the plurality of nozzles, disposition in which the plurality of nozzles are arranged in a row in the width direction of the substrate S may be applied. Disposition in which the plurality of nozzles are arranged in a two-dimensional manner may be applied. As the disposition in which the plurality of nozzles are arranged in a two-dimensional manner, zigzag disposition in two rows and matrix disposition may be applied.

The term "aqueous ink" means an ink obtained by dissolving or dispersing a coloring material, such as a dye and a pigment, in water and a solvent soluble in water. Herein, an aqueous pigment ink is used as the aqueous ink. In addition, the aqueous ink may contain wax.

The substrate S is guided by the pass rollers 30 and is transported from a position facing the ink jet head 32 to a position facing the radiation heating unit 34. Arrow lines shown in FIG. 2 indicate the transport direction of the substrate S in the printing main drying unit 60.

The radiation heating unit 34 comprises an infrared heater. The infrared heater radiates infrared rays toward the front surface SA of the substrate S to heat the substrate S. The radiation heating unit 34 may comprise a hot air fan that supplies hot air to the front surface SA of the substrate S. The infrared heater and the hot air fan are not shown.

The substrate S is guided by the pass rollers 30 and is transported to the drying drum 36 from the position facing the radiation heating unit 34. The substrate S is wound around an outer peripheral surface 36B of the drying drum 36.

The drying drum 36 has a cylindrical shape, and a rotation shaft 36A is rotatably supported. SUS is applied as a material for the outer peripheral surface 36B of the drying drum 36. SUS is an abbreviation for Steel Use Stainless.

The drying drum 36 comprises a heater 36C therein. The heater 36C heats the outer peripheral surface 36B. The drying drum 36 heats the substrate S by bringing the substrate S into contact with the outer peripheral surface 36B. In addition, a rotation shaft of a motor 36D is connected to the rotation shaft 36A of the drying drum 36. A connecting member such as a gear is used in connection between the rotation shaft 36A and the rotation shaft of the motor 36D of the drying drum 36.

In a case where the motor 36D is operated, the drying drum 36 is rotationally driven with the rotation shaft 36A as a rotation center. The drying drum 36 rotates by bringing the outer peripheral surface 36B into contact with the back surface SB of the substrate S on an opposite side to the front surface SA on which an image is printed and transports the substrate S while heating from the back surface SB. In a case of the back surface printing main drying unit 20, a surface of the substrate S on which an image is printed is the back surface SB of the substrate S, and a surface of the substrate S on the opposite side to the surface of the substrate S on which the image is printed is the front surface SA of the substrate S. The substrate S heated using the drying drum 36 is guided by the pass rollers 30 and is discharged from the drying drum 36 to the outside of the printing main drying unit 60.

In a case where an ink applied region, to which an ink is applied, on the surface of the substrate S on which an image is printed after the drying treatment, is separated from the drying drum 36, a member that first comes into contact therewith is a first touch member, among members disposed on a downstream side of the drying drum 36 in the transport direction of the substrate S. A cooling roller 31 closest to the drying drum 36 in the transport path for the substrate S can be understood as a first touch roller which is the first touch member.

In a case of the front surface printing main drying unit 16 shown in FIG. 1, the first touch member is a member with which the front surface SA of the substrate S, which has been printed using the ink jet head 32 and which has been subjected to the drying treatment, comes into contact first in a case of being separated from the drying drum 36.

In a case of the back surface printing main drying unit 20, the first touch member is a member with which the back surface SB of the substrate S, which has been printed using the ink jet head 32 and which has been subjected to the drying treatment, comes into contact first in a case of being separated from the drying drum 36.

In the printing main drying unit 60 shown in FIG. 2, the first touch member is the cooling roller 31 in both the case of the front surface printing main drying unit 16 and the case of the back surface printing main drying unit 20.

The cooling roller 31 functioning as the first touch member has a cylindrical shape, and SUS is applied to a surface 31A. The cooling roller 31 is subjected to a plating treatment on the surface 31A, and physical properties thereof are adjusted.

The cooling roller 31 comprises a cooling structure that cools the substrate S that has been subjected to the drying treatment. A water cooling method in which water adjusted to be in a specified temperature range is circulated as a refrigerant is applied to the cooling structure of the cooling roller 31.

The front surface SA of the substrate S in the front surface printing main drying unit 16 described in the embodiment is an example of a liquid adhering surface of a medium, to which a liquid is adhered, and the back surface SB of the substrate S in the back surface printing main drying unit 20 is an example of the liquid adhering surface of the medium, to which the liquid is adhered. The cooling roller 31 described in the embodiment is an example of a contact member. The ink applied region described in the embodiment is an example of a liquid applied region.

[Configuration Example of Cooling Roller]

Figure 3:
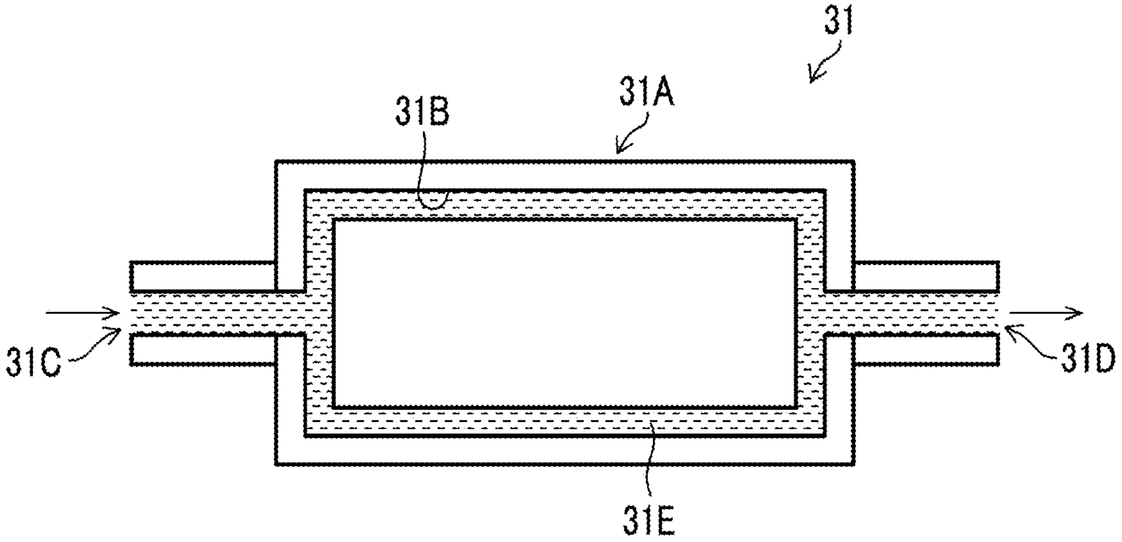
FIG. 3 is a schematic view showing a configuration example of a cooling roller.

FIG. 3 is a schematic view showing a configuration example of the cooling roller. FIG. 3 schematically shows an internal structure of the cooling roller 31. The cooling roller 31 has a cooling water flow passage formed therein, and cooling water 31E flowing in from a cooling water inlet 31C is discharged from a cooling water outlet 31D via a cooling water flow passage 31B. The cooling roller 31 circulates cooling water adjusted to be in the specified temperature range, and the surface 31A is adjusted to be in the specified temperature range. In the cooling roller 31, a gas may be used as a refrigerant. The cooling water inlet 31C and the cooling water outlet 31D are connected to a temperature adjusting device that adjusts the temperature of the cooling water.

[Electric Configuration of Printing System]

Figure 4:
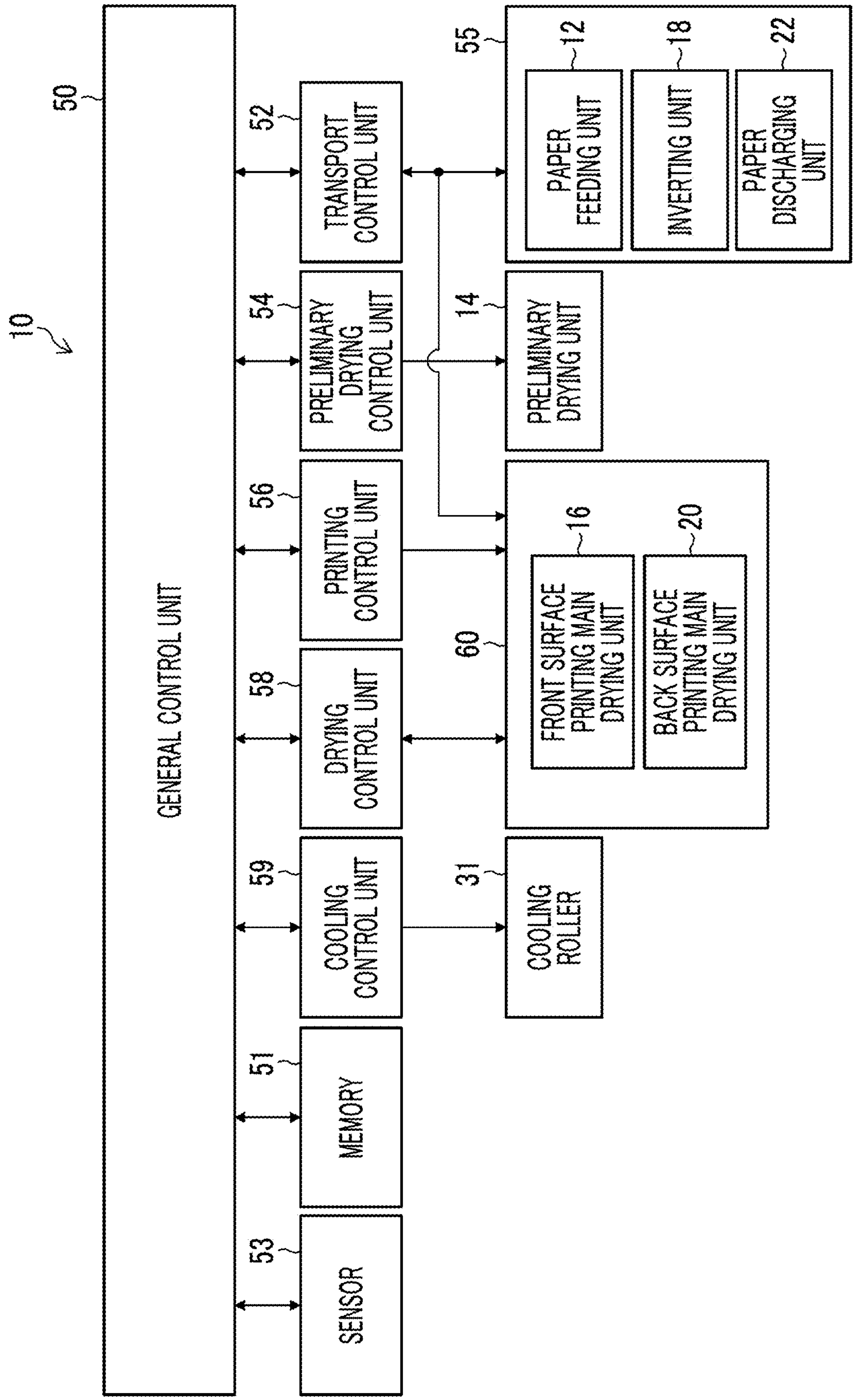
FIG. 4 is a functional block diagram showing an electric configuration of the printing system shown in FIG. 1.

FIG. 4 is a functional block diagram showing an electric configuration of the printing system shown in FIG. 1. The printing system 10 comprises a general control unit 50. The general control unit 50 performs general control of the printing system 10. The general control unit 50 functions as a memory controller that controls reading out of data and storage of data with respect to a storage device, such as a memory 51.

The general control unit 50 acquires a sensor signal transmitted from a sensor 53. The general control unit 50 transmits a command signal to various types of control units based on information represented by the sensor signal and controls an operation of each unit via the various types of control units.

The printing system 10 comprises a transport control unit 52. The transport control unit 52 controls a transport device 55 that transports the substrate S based on a command signal transmitted from the general control unit 50. The transport device 55 shown in FIG. 4 includes the paper feeding unit 12, the inverting unit 18, and the paper discharging unit 22. The transport device 55 includes the preliminary drying transport device provided in the preliminary drying unit 14 shown in FIG. 1, the front surface printing and transport device provided in the front surface printing main drying unit 16, and the back surface printing and transport device provided in the back surface printing main drying unit 20.

The transport control unit 52 controls an operation of the motor of the paper feeding unit 12, the turn bar of the inverting unit 18, the motor of the paper discharging unit 22, and the like and transports the substrate S by applying a specified transportation speed. The transport control unit 52 transports the substrate S by applying specified transport tension to the substrate S. The transport control unit 52 controls the rotational driving of the drying drum 36 provided in the front surface printing main drying unit 16 and the back surface printing main drying unit 20.

The printing system 10 comprises a preliminary drying control unit 54. The preliminary drying control unit 54 preliminarily dries the substrate S by applying a specified preliminary drying condition and controlling an operation of the heating device of the preliminary drying unit 14 based on a command signal transmitted from the general control unit 50.

The printing system 10 comprises a printing control unit 56. The printing control unit 56 controls the ink jet head 32 provided in each of the front surface printing main drying unit 16 and the back surface printing main drying unit 20 to print an image on the substrate S.

The printing control unit 56 comprises an image processing unit that generates a halftone image of a printed image from print data. The printing control unit 56 comprises a drive voltage generation unit that generates a drive voltage supplied to the ink jet head 32 based on dot disposition information and dot size information based on the halftone image. The printing control unit 56 comprises a drive voltage supply circuit that supplies a drive voltage to the ink jet head 32. The printing control unit 56 comprises a correction processing unit that performs various types of correction processes.

The printing system 10 comprises a drying control unit 58. The drying control unit 58 controls operations of the radiation heating unit 34 and the drying drum 36 provided in each of the front surface printing main drying unit 16 and the back surface printing main drying unit 20 to dry an ink applied to the substrate S.

The printing system 10 comprises a cooling control unit 59. The cooling control unit 59 controls a temperature, flow rate, and the like of cooling water in the cooling roller 31 and cools the substrate S immediately after the drying treatment is performed.

Figure 5:
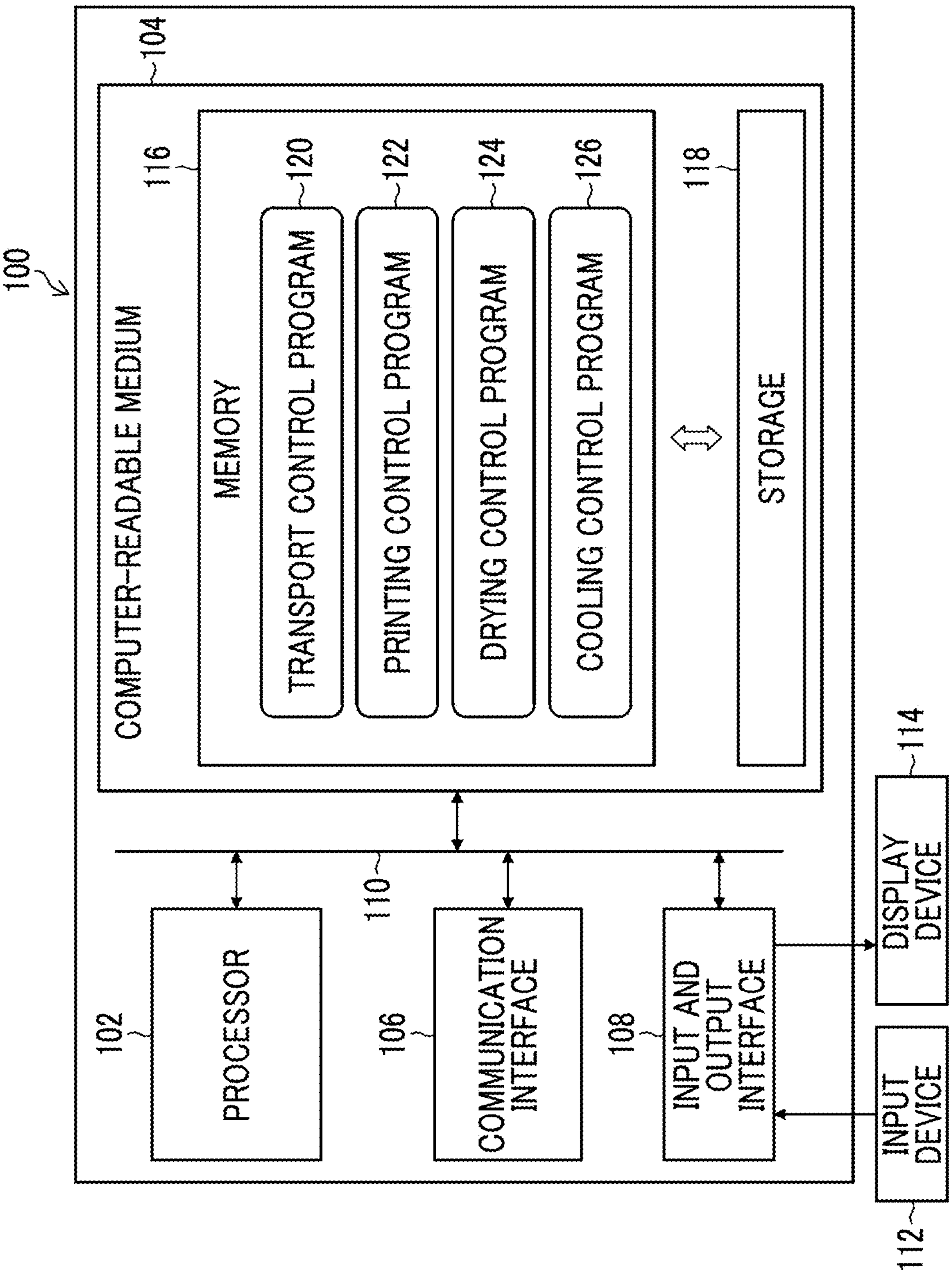
FIG. 5 is a block diagram schematically showing an example of an electric structure of a hardware configuration of a control device of the printing system shown in FIG. 4.

FIG. 5 is a block diagram schematically showing an example of an electric structure of a hardware structure of a control device of the printing system shown in FIG. 4. A control device 100 provided in the printing system 10 comprises a processor 102, a computer-readable medium 104 that is a non-transitory tangible object, a communication interface 106, and an input and output interface 108.

A computer is applied to the control device 100. A form of the computer may be a server, may be a personal computer, may be a workstation, and may be a tablet terminal or the like.

The processor 102 includes a central processing unit (CPU). The processor 102 may include a graphics processing unit (GPU). The processor 102 is connected to the computer-readable medium 104, the communication interface 106, and the input and output interface 108 via a bus 110. An input device 112 and a display device 114 are connected to the bus 110 via the input and output interface 108.

The computer-readable medium 104 includes a memory 116 which is a main memory and a storage 118 which is an auxiliary memory. A semiconductor memory, a hard disk apparatus, a solid state drive apparatus, and the like can be applied to the computer-readable medium 104. Any combination of a plurality of apparatuses can be applied to the computer-readable medium 104.

The hard disk apparatus can be referred to as an HDD which is an abbreviation for a hard disk drive. The solid state drive apparatus can be referred to as an SSD which is an abbreviation for a solid state drive.

The control device 100 is connected to a network via the communication interface 106 and is communicably connected to an external device. A local area network (LAN) or the like can be applied to the network. The network is not shown.

The computer-readable medium 104 stores a transport control program 120, a printing control program 122, a drying control program 124, and a cooling control program 126. The transport control program 120 is applied to the transport control unit 52 shown in FIG. 4 and realizes a transport function of the substrate S of the transport device 55. The printing control program 122 is applied to the printing control unit 56 and realizes a printing function of the front surface printing device of the front surface printing main drying unit 16 and the back surface printing device of the back surface printing main drying unit 20.

The drying control program 124 is applied to the drying control unit 58. The drying control program 124 realizes a drying function of the preliminary drying unit 14, the front surface main drying device of the front surface printing main drying unit 16, and the back surface main drying device of the back surface printing main drying unit 20.

The cooling control program 126 is applied to the cooling control unit 59. The cooling control program 126 realizes a cooling function of cooling the substrate S after the drying treatment using the cooling roller 31 is performed.

Various types of programs stored in the computer-readable medium 104 include one or more commands. Various types of data, various types of parameters, and the like are stored in the computer-readable medium 104. The memory 51 shown in FIG. 4 can be included in the memory 116 of the computer-readable medium 104 shown in FIG. 5.

In the printing system 10, the processor 102 executes various types of programs stored in the computer-readable medium 104 and realizes various types of functions of the printing system 10. The term "program" is synonymous with the term "software".

The control device 100 performs data communication with an external device via the communication interface 106. Various types of standards, such as a universal serial bus (USB), can be applied to the communication interface 106. Any one of wired communication or wireless communication may be applied to a communication form of the communication interface 106.

The input device 112 and the display device 114 are connected to the control device 100 via the input and output interface 108. An input device, such as a keyboard and a mouse, is applied to the input device 112. The display device 114 displays various types of information applied to the control device 100.

A liquid crystal display, an organic EL display, a projector, and the like can be applied to the display device 114. Any combination of a plurality of devices can be applied to the display device 114. EL of the organic EL display is an abbreviation for electro-luminescence.

Herein, examples of a hardware structure of the processor 102 include a CPU, a GPU, a programmable logic device (PLD), and an application specific integrated circuit (ASIC). The CPU is a general-purpose processor that executes the program and that acts as various functional units. The GPU is a processor specialized in image processing.

The PLD is a processor that can change a configuration of an electric circuit after manufacturing a device. Examples of the PLD include a field programmable gate array (FPGA). The ASIC is a processor comprising a dedicated electric circuit specifically designed to execute a specific process.

One processing section may be composed of one of the various types of processors or may be composed of two or more processors of the same type or different types. Examples of a combination of the various types of processors include a combination of one or more FPGAs and one or more CPUs and a combination of one or more FPGAs and one or more GPUs. Other examples of the combination of the various types of processors include a combination of one or more CPUs and one or more GPUs.

A plurality of functional units may be configured by using one processor. Examples of the plurality of functional units configured by using one processor include, as typified by a computer such as a client and a server, an aspect in which a combination of one or more CPUs and software such as a system on a chip (SoC) is applied to configure one processor, and the processor is caused to act as the plurality of functional units.

Other examples in which the plurality of functional units are configured by using one processor include an aspect in which a processor that realizes the functions of the entire system including the plurality of functional units by using one IC chip is used. IC is an abbreviation for an integrated circuit.

As described above, a various types of functional units are configured by using one or more of the various types of processors described above as the hardware structure. Further, the hardware structure of the various types of processors is, more specifically, an electric circuit (circuitry) in which circuit elements, such as semiconductor elements, are combined.

The computer-readable medium 104 can include semiconductor elements, such as a read only memory (ROM), a random access memory (RAM), and a solid state drive (SSD). The computer-readable medium 104 can include a magnetic storage medium, such as a hard disk. The computer-readable medium 104 can be provided with a plurality of types of storage media.

[Operation of Printing System]

The substrate S supplied from the paper feeding unit 12 is transported to the preliminary drying unit 14 and is subjected to the preliminary drying treatment. The substrate S subjected to the preliminary drying treatment is transported to the front surface printing main drying unit 16.

In the front surface printing main drying unit 16, the substrate S is guided by the pass rollers 30 and is transported to the position facing the ink jet head 32. The ink jet head 32 jets liquid droplets of an aqueous ink toward the front surface SA of the substrate S. The jetted liquid droplets adhere to the front surface SA of the substrate S, and an image is printed on the front surface SA of the substrate S.

Next, the substrate S is transported to the position facing the radiation heating unit 34. The radiation heating unit 34 heats the substrate S using the infrared heater. Accordingly, drying of the aqueous ink applied to the front surface SA of the substrate S is promoted.

Further, the substrate S is guided by the pass rollers 30 and is transported to the drying drum 36 from the position facing the radiation heating unit 34. The substrate S is wound around the outer peripheral surface 36B of the drying drum 36. The drying drum 36 rotates while the outer peripheral surface 36B is brought into contact with the back surface of the substrate S, and transports the substrate S while heating from the back surface. Accordingly, drying of the aqueous ink applied to the front surface SA of the substrate S is promoted.

The front surface SA of the substrate S on which the drying treatment of an ink is performed is cooled by being brought into contact with the cooling roller 31. The substrate S having the cooled front surface SA is guided by the pass rollers 30 and is discharged to the outside of the front surface printing main drying unit 16.

The substrate S discharged from the front surface printing main drying unit 16 is transported to the inverting unit 18, and the front and back are inverted using the turn bar. The substrate S of which the front and back are inverted is transported to the back surface printing main drying unit 20.

In the back surface printing main drying unit 20, the substrate S is guided by the pass rollers 30 and is transported to the position facing the ink jet head 32. The ink jet head 32 jets liquid droplets of an aqueous ink toward the back surface SB of the substrate S. The jetted liquid droplets adhere to the back surface SB of the substrate S, and an image is printed on the back surface SB of the substrate S.

Next, the substrate S is transported to the position facing the radiation heating unit 34. The radiation heating unit 34 heats the substrate S using the infrared heater. Accordingly, the drying of the aqueous ink applied to the back surface SB of the substrate S is promoted.

Further, the substrate S is guided by the pass rollers 30 and is transported to the drying drum 36 from the position facing the radiation heating unit 34. The substrate S is wound around the outer peripheral surface 36B of the drying drum 36. The drying drum 36 rotates while bringing the outer peripheral surface 36B into contact with the front surface SA of the substrate S and transports the substrate S while heating the substrate S from the front surface SA. Accordingly, the drying of the aqueous ink applied to the back surface SB of the substrate S is promoted.

The back surface SB of the substrate S on which the drying treatment of an ink is performed is cooled by being brought into contact with the cooling roller 31. The substrate S of which the back surface SB is cooled is guided by the pass rollers 30 and is discharged to the outside of the back surface printing main drying unit 20. The substrate S discharged from the back surface printing main drying unit 20 is transported to the paper discharging unit 22 and is wound around a winding roll.

As described above, the printing system 10 transports the substrate S in the order of the paper feeding unit 12, the preliminary drying unit 14, the front surface printing main drying unit 16, the inverting unit 18, the back surface printing main drying unit 20, and the paper discharging unit 22, performs each treatment on the substrate S, and manufactures a printed material.

[Detailed Description of Cooling Roller]

Next, the cooling roller 31 functioning as the first touch roller will be described in detail. The first touch roller described in the embodiment is an example of the first touch member.

The cooling roller 31 shown in FIG. 3 and the like suppresses adhesion of an ink in a case of coming into contact with the substrate S immediately after the drying treatment is performed. Accordingly, it is possible to take measures against an image defect in which a part of the ink is peeled off from a printed material. The cooling roller 31 has the following two characteristics.

The following is description of a case where an image is printed on the front surface SA of the substrate S shown in FIG. 2. In a case where the image is printed on the back surface SB of the substrate S, the front surface SA of the substrate S in the following description means the back surface SB of the substrate S.

[Coating for Suppressing Front Surface Contamination]

As bonding work $W_{sl}$ calculated from surface free energy $\gamma_s$ of the cooling roller 31 and surface free energy $\gamma_l$ of an image decreases, an image is less likely to be peeled off in a case where the cooling roller 31 and the image come into contact with each other.

With reference to the Owens and Wendt equation, in a case where a dispersion component is denoted by $\gamma_s^d$ and a polar component is denoted by $\gamma_s^p$, the surface free energy $\gamma_s$ of the cooling roller 31 is represented by $$\gamma_s = \gamma_s^d + \gamma_s^p. \quad \text{Equation 1}$$

Similarly, in a case where a dispersion component is denoted by $\gamma_1^d$ and a polar component is denoted by $\gamma_1^p$, the surface free energy $\gamma_l$ of the image is represented by $$\gamma_l = \gamma_l^d + \gamma_l^p. \quad \text{Equation 2}$$

In addition, surface free energy $\gamma_{sl}$ of an interface between the cooling roller 31 and the image is represented by $$\gamma_{sl} = \{(\gamma_s^d)^{0.5} + (\gamma_l^d)^{0.5}\}^2 + \{(\gamma_s^p)^{0.5} + (\gamma_l^p)^{0.5}\}^2. \quad \text{Equation 3}$$

Using Equation 1, Equation 2, and Equation 3, the bonding work $W_{sl}$ between the cooling roller 31 and the image is represented by $$W_{sl} = \gamma_s + \gamma_l - \gamma_s = 2\times(\gamma_s^d \times \gamma_l^d)^{0.5} + 2\times(\gamma_s^p \times \gamma_l^p)^{0.5}. \quad \text{Equation 4}$$

Millinewtons per meter are applied as the units of the surface free energy and the bonding work.

The surface free energy, the bonding work, and hardness are calculated for each plating treatment by changing the plating treatment applied to a surface treatment of the cooling roller 31, an image is brought into contact with the surface 31A of the cooling roller 31 under a specified condition, and generation of white spots and a durability performance of a surface treatment film of the cooling roller 31 are evaluated. Results of the evaluation test are shown below.

FIG. 6 is a table showing a performance of the cooling roller depending on a difference of the surface treatment. Five types of cooling rollers 31 having different surface treatments are prepared. As the surface treatment, alumite, hard chrome plating, electroless nickel plating, PTFE coating, and PTFE nickel plating are applied.

The surface free energy of the surface 31A of the cooling roller 31 is measured using MSA, which is a double dropwise addition hand-held contact angle and surface free energy analysis device manufactured by KRUSS GmbH. MSA is a product name of the device. In a measurement method, 2 μL of diiodomethane and pure water are added dropwise to measure a contact angle, a component of surface free energy is calculated from a measured value of the contact angle, and the bonding work is calculated from a calculated value of the component of the surface free energy.

The surface free energy of the surface 31A of the cooling roller 31 which has been subjected to the surface treatment described above is 50.1 millinewtons per meter, 70.0 millinewtons per meter, 33.9 millinewtons per meter, 18.5 millinewtons per meter, and 24.5 millinewtons per meter.

A range of a dispersion component $$\gamma_1^d$$

of the surface free energy $\gamma_l$ of the image is $$25.0 \text{ millinewtons per meter} < \gamma_1^d < 55.0 \text{ millinewtons per meter},$$

and a range of a polar component $$\gamma_1^p$$

of the surface free energy $\gamma_l$ of the image is $$4.0 \text{ millinewtons per meter} < \gamma_1^p < 15.0 \text{ millinewtons per meter}.$$

In addition, the bonding work of the surface 31A of the cooling roller 31 calculated from the surface free energy of the surface 31A of the cooling roller 31 described above is 94.2 millinewtons per meter, 109.5 millinewtons per meter, 80.3 millinewtons per meter, 59.4 millinewtons per meter, and 68.3 millinewtons per meter.

As the hardness described in the table of FIG. 6, the Vickers hardness of the surface 31A of the cooling roller 31 is applied, and a measured value obtained by measuring the surface 31A of the cooling roller 31 using a Vickers hardness tester is applied. As the Vickers hardness tester, a product conforming to the Vickers hardness test and a test method specified in JIS Z 2244 is used. The Vickers hardness tester may be a reference product of a method of understanding a hardness level of a metal material specified in ISO 6507-1 or ISO 6507-4.

JIS is an abbreviation for Japanese Industrial Standards. ISO is an abbreviation for International Organization for Standardization.

In a white spot evaluation, an image printed on a front surface of printing paper is brought into contact with the surface 31A of each of five types of cooling rollers 31 having different surface states, and after a specified time has elapsed, the image is visually recognized to check the presence or absence of a white spot. In a case where the printing paper is brought into contact with the surface 31A of the cooling roller 31, specified tension is applied to the printing paper using the cooling roller 31. The image is a 100% solid image using a black ink, a contact time is 10 seconds, and the tension is 100 newtons.

In a durability evaluation, specified tension is applied to the printing paper using the cooling roller 31, the printing paper is continuously transported, and a state of a plating film of the surface 31A of the cooling roller 31 is visually recognized using a microscope. The tension is set to 100 newtons, and a continuous printing time is set to 1,000 hours.

An A evaluation in a white spot evaluation field and a durability performance evaluation field indicates that each viewpoint is very good. A B evaluation indicates that the evaluation is inferior to the A evaluation but is good. A C evaluation indicates that the evaluation is inferior to the B evaluation but the cooling roller can be used as a product. A D evaluation indicates that the cooling roller cannot be used as a product.

From a viewpoint of a white spot, a preferred range of the bonding work is 80.3 millinewtons per meter or less. A more preferred range of the bonding work is 68.3 millinewtons per meter or less. In consideration of a measurement error and significant digits of the measured value of the surface free energy, the preferred range of the bonding work is 81.0 millinewtons per meter or less, and the more preferred range of the bonding work is 69.0 millinewtons per meter or less.

As the bonding work decreases, the surface 31A of the cooling roller 31 may be less likely to be contaminated. A lower limit value of the practical bonding work of the surface 31A of the cooling roller 31 is considered in the viewpoint of contamination. Hexafluoropropylene having the highest hydrophobicity in a fluorine-based resin is applied as a material for the plating film. In consideration of a case where the surface free energy of the image is relatively low, the lower limit value of the bonding work can be set to 35 millinewtons per meter.

In order to relatively reduce the bonding work of the surface 31A of the cooling roller 31, it is effective to devise the surface 31A of the cooling roller 31. As an example of the devise, a glass bead sheet is attached to the surface 31A of the cooling roller 31. On the other hand, the glass bead sheet needs to be regularly replaced. An inside of the printing main drying unit 60 shown in FIG. 2 is narrow, and the glass bead sheet is replaced by removing the cooling roller 31, so that workability is poor.

Examples of the case where regular replacement or the like is not needed include coating of the surface 31A of the cooling roller 31 with a fluorine-based resin such as PTFE and a silicon-based resin. On the other hand, the coating of the fluorine-based resin or the like has a poor durability performance and has a short life compared to the glass bead sheet. For the surface treatment on the surface 31A of the cooling roller 31, application of electroless nickel plating or application of PTEF nickel plating is preferable. The PTFE nickel plating described in the embodiment is an example of a fluorine-based resin eutectic plating treatment.

In addition, in a case where the Vickers hardness of the surface 31A of the cooling roller 31 is 450 Hv or more, a sufficient durability performance is obtained. The surface 31A preferably has relatively high hardness, but an upper limit value of the hardness is practical in a case where hard chrome plating, which is a general-purpose surface treatment as an industrial product, is applied, and the upper limit value of the hardness is 1,000 Hv in terms of the durability performance. From a viewpoint of the durability performance, the surface 31A of the cooling roller 31 preferably has a Vickers hardness in a range of 450 Hv or more and 600 Hv or less.

The cooling roller 31 has a performance, in which the bonding work of the surface 31A is relatively low and contamination is unlikely to occur, and is required to have a performance in which the durability performance is relatively high and regular replacement is not required. In order to satisfy the above conditions, fluorine-based plating in a state where a fluorine-based resin is in a eutectic state is effective as the surface treatment of the surface 31A of the cooling roller 31.

The PTFE nickel plating described in the table shown in FIG. 6 has contamination resistance of a fluorine-based material and the hardness of nickel plating. In a case where the content of PTFE in the plating film is set to 4.0 percent by mass or more and 9.0 percent by mass or less, both the hardness and the surface free energy can be realized in an appropriate range.

[Water-Cooled Cooling Roller]

From a viewpoint of preventing an image defect and preventing contamination of the surface 31A of the cooling roller 31, an effect of friction between an image printed on the substrate S and the surface 31A of the cooling roller 31 is to be minimized as much as possible such that a film of an ink constituting an image is not peeled off from the substrate S. Based on such a viewpoint, sliding between the image and the surface 31A of the cooling roller 31 is avoided, and the cooling roller 31 is driven to rotate, following the movement of the substrate S. In a case where the cooling roller 31 shown in FIG. 2 is a plate-shaped member, the plate-shaped member moves along the transport direction of the substrate S, following the movement of the substrate S.

In a case where an image is cooled, adhesion of an ink constituting the image to the surface 31A of the cooling roller 31 is suppressed. Thus, a cooling roller having an internal structure shown in FIG. 3 is applied to the cooling roller 31. The temperature of the cooling water 31E flowing in the cooling water flow passage 31B of the cooling roller 31 is adjusted to 25° C. or less.

It is checked that in a case where the temperature condition of cooling water described above is applied and a front surface temperature of the substrate S before passing through the surface 31A of the cooling roller 31 is 90° C. or more and 180° C. or less, a temperature difference in the front surface temperature of the substrate S before and after passing through the surface 31A of the cooling roller 31 is 60° C. or more. That is, the cooling roller 31 can perform a cooling treatment on the substrate S, in which a temperature difference between a front surface temperature of the substrate S before cooling and a surface temperature of the substrate S after cooling becomes 60° C. or more.

A surface pressure, which is a pressure per unit area acting between the cooling roller 31 and the substrate S, may be relatively small from a viewpoint of suppressing ink adhesion to the surface 31A of the cooling roller 31. The diameter of the cooling roller 31 is preferably 280 millimeters or more. An upper limit value of the diameter of the cooling roller 31 is determined according to conditions of a space where the cooling roller 31 is disposed and conditions of restrictions on a processing device for the surface treatment, and the like.

[Moisture Content of Substrate]

In the printing system 10 shown in FIG. 1, the ink jet method, in which a pretreatment liquid is not applied and an aqueous ink is applied, is applied. The substrate S is in a continuous form, and the roll-to-roll method is applied as a transport method of the substrate S. The moisture content of the substrate S in an untreated state may be 1.2% or more and 14.3% or less. The preliminary drying unit 14 shown in FIG. 1 can adjust the moisture content of the substrate S in an untreated state to be in the above range.

[Melting Point of Wax]

A melting point of wax contained in an aqueous ink is important for reducing stickiness of an image. From the viewpoint of reducing the stickiness of the image, the melting point of the wax may be 90° C. or less. The wax may have a relatively low melting point insofar as bleeding does not occur at a normal temperature. As the low melting point wax, paraffin wax having a melting point of 47° C. is appropriate.

[Solvent Amount on Substrate]

As shown in FIG. 2, the substrate S on which an image is printed is dried as thermal energy radiated from the radiation heating unit 34 and thermal energy conducted using the drying drum 36 are caused to act on. In a case where drying of the image printed on the substrate S is excessively weak, the stickiness of the image is excessively strong, and there can be a case where only measures for the cooling roller 31 is not sufficient. Thus, in the drying treatment on the substrate S for which the radiation heating unit 34 and the drying drum 36 are used, it is important that a solvent amount represented by the mass of a solvent per unit area of the substrate S, to which a permeation medium is applied, is 250 micrograms per square centimeter or less. A drying treatment in which the solvent amount of the substrate S is 148 micrograms per square centimeter is more preferable.

FIG. 7 is a table showing evaluation results of a solvent amount on the substrate. In FIG. 7, the solvent amount of the substrate S is changed stepwise by changing parameters of the drying treatment, and generation of white spots and generation of blisters are evaluated for six types of solvent amounts.

The solvent amount of the substrate S is set to 300 micrograms per square meter, 250 micrograms per square meter, 200 micrograms per square meter, 148 micrograms per square meter, 105 micrograms per square meter, and 50 micrograms per square meter.

The solvent amount of the substrate S is calculated by measuring the mass of the substrate S before and after the drying treatment, subtracting the mass of the substrate S after the drying treatment from the mass of the substrate S before the drying treatment, and dividing the subtraction value by the area of the substrate S.

By using two types of cooling rollers 31 having different surface treatments, an image is brought into contact with the surface 31A of the cooling roller 31 under the specified conditions, and the presence or absence of a white spot and the presence or absence of a blister are checked through visual observation of the image. The image is a 100% solid image using a black ink, a contact time is 10 seconds, and the tension is 100 newtons.

The A evaluation indicates that each viewpoint is very good. A B evaluation indicates that the evaluation is inferior to the A evaluation but is good. A C evaluation indicates that the evaluation is inferior to the B evaluation but the cooling roller can be used as a product. A D evaluation indicates that the cooling roller cannot be used as a product. PTFE nickel plating and electroless nickel plating are applied to the surface 31A of the cooling roller 31.

In a case where the surface treatment is PTFE nickel plating, both a white spot and a blister are good in a case where the solvent amount of the substrate S is in a range of 50 micrograms per square centimeter or more and 300 micrograms per square centimeter or less.

On the other hand, in a case where the surface treatment is electroless nickel plating, from the viewpoint of a white spot, the solvent amount of the substrate S is preferably in a range of 50 micrograms per square centimeter or more and 200 micrograms per square centimeter or less. On the other hand, in a case where the solvent amount of the substrate S is in a range of 50 micrograms per square centimeter or more and 300 micrograms per square centimeter or less, the blister is good.

That is, a preferred range of the solvent amount of the substrate S is preferably 200 micrograms per square centimeter or less. A more preferred range of the solvent amount of the substrate S is 148 micrograms per square centimeter or less.

The solvent amount of the substrate S is preferably as small as possible, but an excessive drying treatment on the substrate S can cause a problem in an image quality, such as generation of blisters. From the viewpoint of avoiding the excessive drying treatment, a practical lower limit value of the solvent amount of the substrate S can be set to 105 micrograms per square centimeter.

In summary, in a case where the surface treatment of the cooling roller 31 is PTFE nickel plating, a preferred range of the solvent amount of the substrate S is 105 micrograms per square centimeter or more and 250 micrograms per square centimeter or less. A more preferred range of the solvent amount of the substrate S is 105 micrograms per square centimeter or more and 148 micrograms per square centimeter or less.

In a case where the surface treatment of the cooling roller 31 is electroless nickel plating, a preferred range of the solvent amount of the substrate S is 105 micrograms per square centimeter or more and 200 micrograms per square centimeter or less. A more preferred range of the solvent amount of the substrate S is 105 micrograms per square centimeter or more and 148 micrograms per square centimeter or less.

In a case where the front surface temperature of the substrate S immediately before coming into contact with the cooling roller 31 is 90° C. or more and 180° C. or less, the solvent amount of the substrate S described above is realized. This is because a combination of a plurality of types of substrates S and a plurality of printing conditions that are generally used for printing in an ink jet method is tested and checked.

[Variations of First Touch Member]

Next, variations of the first touch member will be described. The first touch member is a member that first comes into contact with an image printed on the substrate S after the drying treatment on the substrate S. In a case of the printing main drying unit 60 shown in FIG. 2, the cooling roller 31 is a member that first comes into contact with a surface of the substrate S subjected to the drying treatment, to which an ink is applied and on which an image is printed, in a case of being separated from the drying drum 36.

First Modification Example

Figure 8:
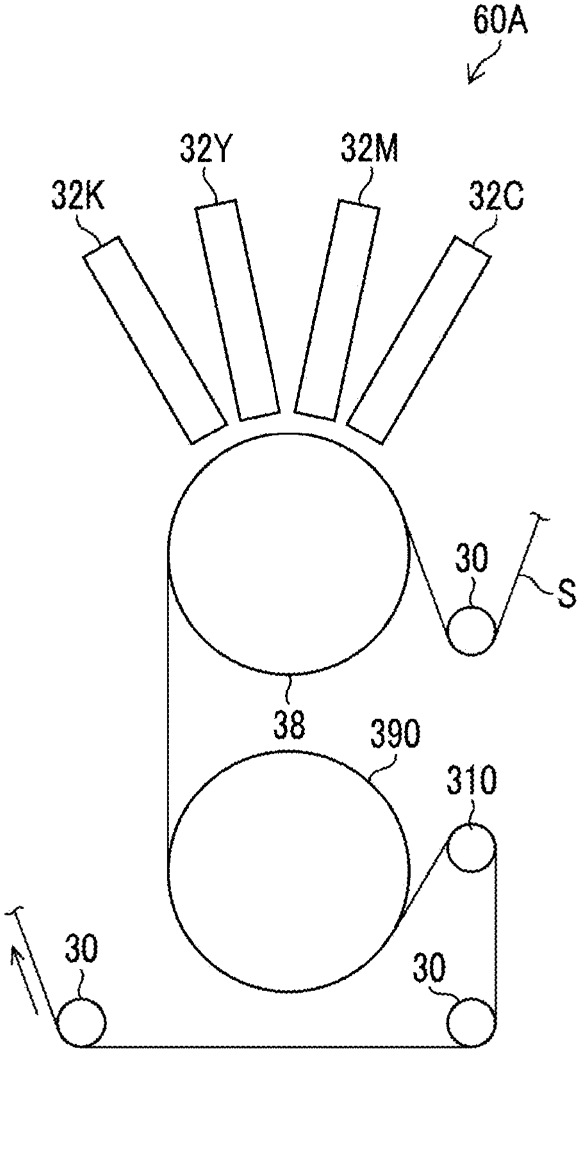
FIG. 8 is a configuration view showing a schematic configuration of a printing main drying unit according to a first modification example.

FIG. 8 is a configuration view showing a schematic configuration of a printing main drying unit according to a first modification example. A printing main drying unit 60A shown in the drawing comprises an ink jet head 32C, an ink jet head 32M, an ink jet head 32Y, an ink jet head 32K, and a printing drum 38. In addition, the printing main drying unit 60A comprises a drying drum 390.

The plurality of pass rollers 30 are disposed on the transport path for the substrate S in the printing main drying unit 60A. The substrate S carried into the printing main drying unit 60A is supported by the pass rollers 30 and is transported to the printing drum 38. The substrate S is wound around an outer peripheral surface of the printing drum 38.

The printing drum 38 has a cylindrical shape, and a rotation shaft is rotatably supported. The rotation shaft of the printing drum 38 is connected to a rotation shaft of a motor which is a drive source of the printing drum 38. The printing drum 38 is rotationally driven around the rotation shaft in accordance with the driving of the motor, which is the drive source. The rotation shaft of the printing drum 38 and the motor are not shown.

The printing drum 38 is rotationally driven with the support surface of the substrate S on the opposite side to the printing surface held by the outer peripheral surface and transports the substrate S along the transport direction of the substrate S along the outer peripheral surface of the printing drum 38. The outer peripheral surface of the printing drum 38 may be provided with a suction hole used for suction-supporting of the substrate S.

The ink jet head 32C, the ink jet head 32M, the ink jet head 32Y, and the ink jet head 32K use aqueous inks of cyan, magenta, yellow, and black, respectively.

Each of the ink jet head 32C, the ink jet head 32M, the ink jet head 32Y, and the ink jet head 32K is disposed at a certain interval along the transport path for the substrate S using the printing drum 38.

Herein, a configuration where four colors of inks of cyan, magenta, yellow, and black are used is exemplified, but a combination of ink colors and the number of colors is not limited to the present embodiment, and a light ink, a dark ink, and a special color ink may be added as necessary.

The substrate S that is transported using the printing drum 38 and that has a printing surface, on which an image is printed using the ink jet head 32C, the ink jet head 32M, the ink jet head 32Y, and the ink jet head 32K, is transported to the drying drum 390.

The same configuration as that of the drying drum 36 shown in FIG. 2 is applied to the drying drum 390. Herein, description related to the configuration of the drying drum 390 will be omitted. The term "same" referred to herein may be substantially the same that is considered to be the same although there is a difference. In FIG. 8, the rotation shaft of the drying drum 390, a heater provided inside the drying drum 390, and a motor connected to the rotation shaft are not shown.

A cooling roller 310 closest to the drying drum 390 along the transport path for the substrate S functions as the first touch member. The same configuration as that of the cooling roller 31 shown in FIG. 2 is applied to the cooling roller 310 shown in FIG. 8. The term "same" referred to herein may be substantially the same as described above.

Second Modification Example

Figure 9:
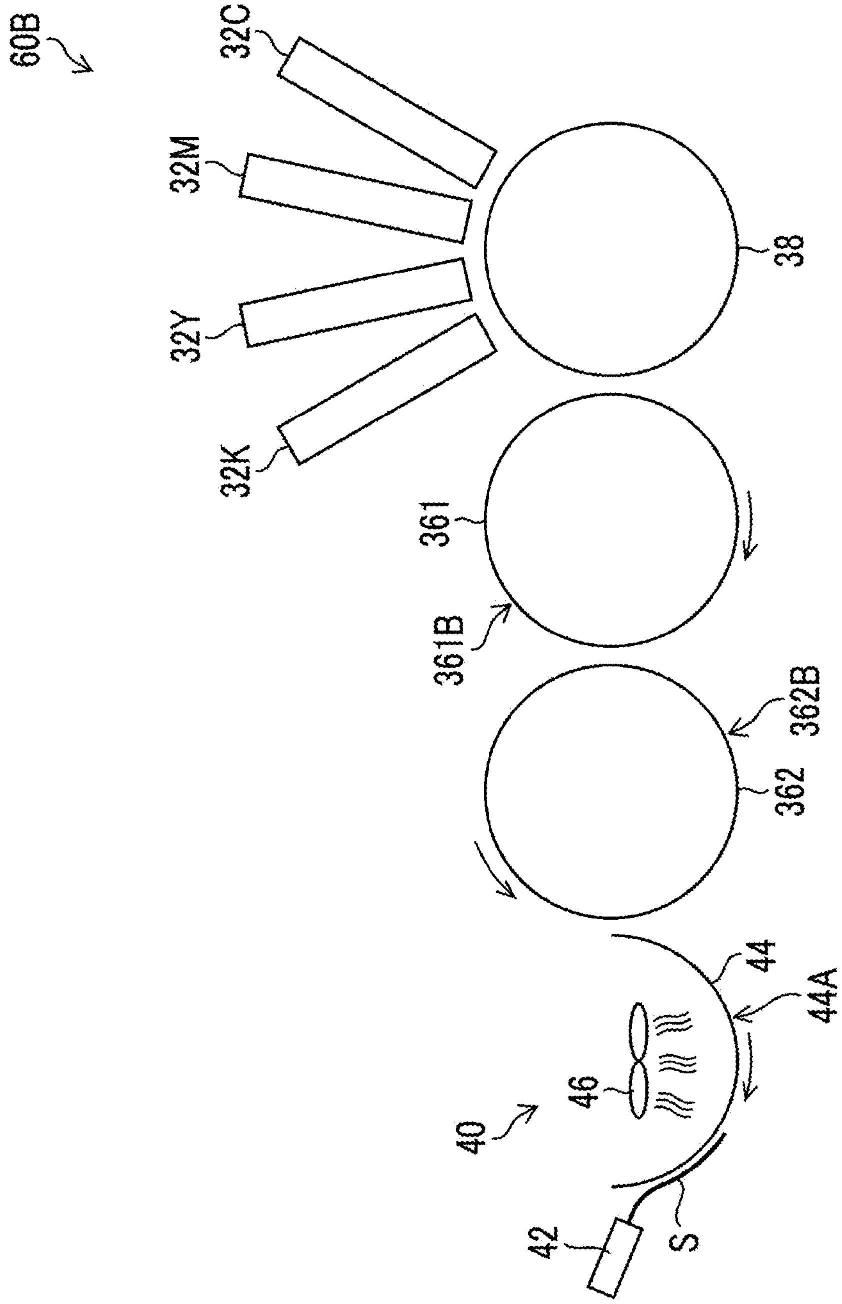
FIG. 9 is a configuration view showing a schematic configuration of a printing main drying unit according to a second modification example.

FIG. 9 is a configuration view showing a schematic configuration of a printing main drying unit according to a second modification example. A printing main drying unit 60B according to the second modification example performs printing on the single-sheet substrate S. The printing main drying unit 60B comprises a first drying drum 361, a second drying drum 362, and a cooling unit 40.

The substrate S that is transported using the printing drum 38 and that has a printing surface, on which an image is printed using the ink jet head 32C, the ink jet head 32M, the ink jet head 32Y, and the ink jet head 32K, is transferred from the printing drum 38 to the first drying drum 361.

The first drying drum 361 rotates about a rotation axis while bringing an outer peripheral surface 361B into contact with the printing surface of the substrate S to transport the substrate S and heats the printing surface of the substrate S. The substrate S in which drying of an aqueous ink is promoted is transferred from the first drying drum 361 to the second drying drum 362.

The second drying drum 362 rotates about a rotation axis while bringing an outer peripheral surface 362B into contact with the support surface of the substrate S on the opposite side to the printing surface to transport the substrate S and heats the support surface of the substrate S. The substrate S in which drying of an aqueous ink is promoted is transferred from the second drying drum 362 to the cooling unit 40.

The cooling unit 40 comprises a holding portion 42, a sliding cooling member 44, and a cold air fan 46. The holding portion 42 holds a tip part of the substrate S transferred from the second drying drum 362 and transports the substrate S along the transport path along the sliding cooling member 44. The substrate S transported using the holding portion 42 has the printing surface that slides on the sliding cooling member 44. The sliding cooling member 44 is cooled using the cold air fan 46 from a surface on the opposite side to a sliding surface 44A on which the substrate S slides. Therefore, the printing surface of the substrate S that comes into contact with the sliding surface 44A of the sliding cooling member 44 is cooled and discharged to the outside of the printing main drying unit 60B.

In the printing main drying unit 60B, the sliding cooling member 44 functions as the first touch member. The sliding surface 44A of the sliding cooling member 44 is subjected to the same surface treatment as that for the surface 31A of the cooling roller 31 shown in FIG. 2.

Third Modification Example

Figure 10:
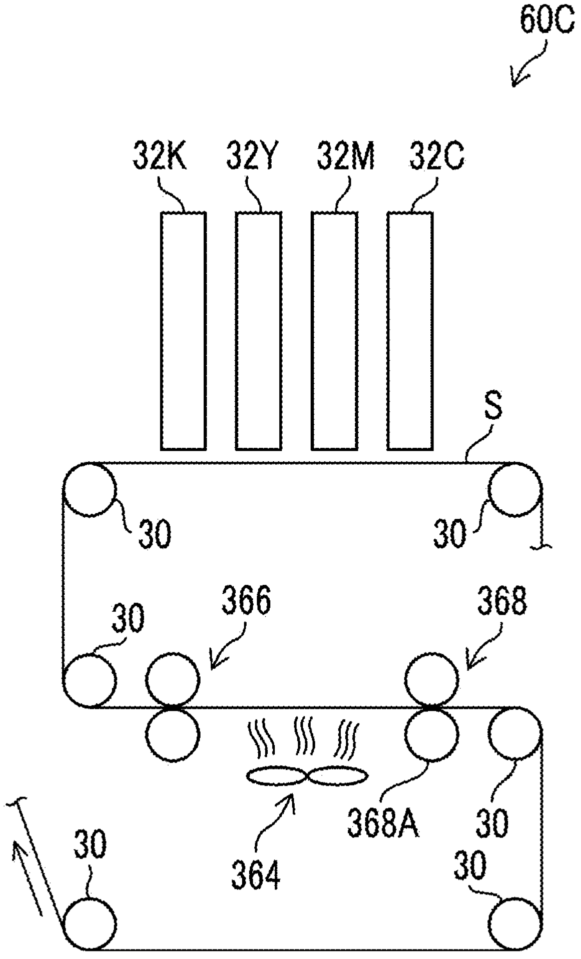
FIG. 10 is a configuration view showing a schematic configuration of a printing main drying unit according to a third modification example.

FIG. 10 is a configuration view showing a schematic configuration of a printing main drying unit according to a third modification example. A printing main drying unit 60C shown in the drawing comprises a hot air drying device 364 that blows hot air to the substrate S, instead of the drying drum 36 shown in FIG. 2.

In addition, the printing main drying unit 60C comprises a first nip roller pair 366 and a second nip roller pair 368. The first nip roller pair 366 is disposed at a position on an upstream side of the hot air drying device 364 in the transport direction of the substrate S. The second nip roller pair 368 is disposed at a position on the downstream side of the hot air drying device 364 in the transport direction of the substrate S.

Hot air blown from the hot air drying device 364 acts on the printing surface of the substrate S that is supported and transported using the first nip roller pair 366 and the second nip roller pair 368, thereby promoting drying of an aqueous ink. The printing surface of the substrate S that has been subjected to the drying treatment using the hot air drying device 364 first comes into contact with a first roller 368A of the second nip roller pair 368.

That is, the first roller 368A of the second nip roller pair 368 functions as the first touch member. A surface of the first roller 368A is subjected to the same surface treatment as that for the surface 31A of the cooling roller 31 shown in FIG. 2.

A roller shape of the cooling roller or the like shown in FIG. 2 may be applied to the first touch member, or a non-roller shape of the sliding cooling member 44 or the like shown in FIG. 9 may be applied. The non-roller shape may be a prism such as a triangular prism and a quadrangular prism or may be a spherical shape.

Fourth Modification Example

As the cooling roller 31 shown in FIG. 2, a cooling roller group in which a plurality of cooling rollers are consecutively disposed may be applied. In the cooling roller group, the cooling roller disposed at a most upstream position in the transport direction of the substrate S may be subjected to the same surface treatment as that for the cooling roller 31 shown in FIG. 2. The same surface treatment as that for the cooling roller 31 may be performed on all of the plurality of cooling rollers, or the same surface treatment as that for the cooling roller 31 may be performed on half of the cooling rollers on the upstream side in the transport direction of the substrate S.

As a disposition example in which the plurality of cooling rollers are disposed consecutively, an aspect in which a distance between cooling rollers adjacent to each other exceeds a radius of the cooling roller and is less than a diameter of the cooling roller is used.

Operational Effects of Embodiment

The printing system 10 according to the embodiment can obtain the following operational effects.

[1]

In the first touch member that first comes into contact with an image printed on the substrate S after the substrate S is subjected to the drying treatment, the bonding work of a contact surface that comes into contact with the image is 81.0 millinewtons per meter or less, and the Vickers hardness of the contact surface is 450 Hv or more and 600 Hv or less. Accordingly, generation of an image defect such as a white spot is suppressed. In addition, a certain durability performance is ensured, the first touch member is not required to be replaced, and the workability of maintenance of the printing system 10 is expected to be improved.

[2]

The first touch member has a function of cooling the substrate S after the drying treatment is performed. Accordingly, the strength of an image printed on the substrate S is improved, and measures against contamination of the first touch member can be taken.

[3]

As the surface treatment of the first touch member, PTFE nickel plating which is a eutectic plating treatment using a fluorine-based resin is applied. Accordingly, a desired surface treatment can be performed on the first touch member.

[4]

The solvent amount of the substrate S after the drying treatment is adjusted to 250 micrograms per square centimeter or less. Accordingly, stickiness of an image is suppressed.

[5]

The temperature of the printing surface of the substrate S, on which an image is printed, after the drying treatment is adjusted to 90° C. or more and 180° C. or less. Accordingly, the excessive drying treatment on the substrate S is suppressed.

[6]

An ink applied to printing contains wax having a melting point of 90° C. or less. Accordingly, stickiness of an image is suppressed.

[Variations of Printing System]

Although the printing system 10 that performs double-sided printing in which an image is printed on both surfaces of the substrate S is exemplified in FIG. 1, a single-sided printing device that is not provided with the inverting unit 18 and the back surface printing main drying unit 20 shown in FIG. 1 and that prints an image on one surface of the substrate S may be used.

In addition, the printing system 10 may be configured as the liquid application system that jets a functional liquid to the substrate S by applying an ink jet method and forms a pattern on a pattern forming surface of the substrate S. That is, the printing system 10 can be configured as the liquid application system comprising the liquid application device, the drying device, and the transport device that transports the substrate S.

[Variations of Substrate]

In the present embodiment, an example of paper has been described as the substrate S, but various types of media can be used as the substrate S regardless of a material and a shape, such as a resin sheet and a film.

[Application Example of Medium Processing Device]

The printing main drying unit 60 shown in FIG. 2 may be a medium processing device comprising the drying device that performs the drying treatment on the substrate S and the transport device that transports the substrate S, without the ink jet head 32 being provided.

The technical scope of the present invention is not limited to the scope described in the embodiment. The configuration and the like in each embodiment can be combined between the embodiments as appropriate without departing from the gist of the present invention.

EXPLANATION OF REFERENCES

- 10: ink jet recording device
- 12: paper feeding unit
- 14: preliminary drying unit
- 16: front surface printing main drying unit
- 18: inverting unit
- 20: back surface printing main drying unit

22: paper discharging unit
30: pass roller
31: cooling roller
31A: front surface
31B: cooling water flow passage
31C: cooling water inlet
31D: cooling water outlet
31E: cooling water
32: ink jet head
32C: ink jet head
32K: ink jet head
32M: ink jet head
32Y: ink jet head
34: radiation heating unit
36: drying drum
36A: rotation shaft
36B: outer peripheral surface
36C: heater
36D: motor
38: printing drum
40: cooling unit
42: holding portion
44: sliding cooling member
44A: sliding surface
46: cold air fan
50: general control unit
51: memory
52: transport control unit
53: sensor
54: preliminary drying control unit
55: transport device
56: printing control unit
58: drying control unit
59: cooling control unit
60: printing main drying unit
60A: printing main drying unit
60B: printing main drying unit
60C: printing main drying unit
310: cooling roller
361: first drying drum
361B: outer peripheral surface
362: second drying drum
362B: outer peripheral surface
364: hot air drying device
366: first nip roller pair
368: second nip roller pair
368A: first roller
390: drying drum
S: substrate

What is claimed is:

1. A medium processing device comprising:

a drying device that performs a drying treatment on a medium to which a liquid is applied; and a contact member that first comes into contact with a liquid adhering surface of the medium subjected to the drying treatment using the drying device, to which the liquid is adhered, after the drying treatment, wherein the drying device performs the drying treatment on the medium so that a mass of the liquid per unit area on the liquid adhering surface of the medium is 200 micrograms per square centimeter or less, the contact member has a cooling structure that cools the medium, bonding work of a contact surface that comes into contact with the liquid adhering surface with respect to a liquid applied region of the liquid adhering surface of the medium where the liquid is applied is 81 millinewtons per meter or less, and Vickers hardness of the contact surface is 450 Hv or more and 600 Hv or less.

2. The medium processing device according to claim 1, wherein the contact member performs a eutectic plating treatment on the contact surface.

3. The medium processing device according to claim 1, wherein the contact member performs a fluorine-based resin eutectic plating treatment on the contact surface.

4. The medium processing device according to claim 3, wherein a plating film on the contact surface of the contact member contains a fluorine-based resin of 4.0 percent by mass or more and 9.0 percent by mass or less.

5. The medium processing device according to claim 1, wherein the contact member has a roller shape.

6. The medium processing device according to claim 1, wherein a method of circulating the liquid adjusted to be in a specified temperature range is applied to the cooling structure.

7. The medium processing device according to claim 6, further comprising:

one or more processors; and one or more memories in which a program executed by the one or more processors is stored, wherein the one or more processors are configured to execute a command of the program, and the liquid applied to the cooling structure is adjusted to 25° C. or less.

8. The medium processing device according to claim 6, further comprising:

one or more processors; and one or more memories in which a program executed by the one or more processors is stored, wherein the one or more processors are configured to execute a command of the program, and cooling in which a temperature difference before cooling and after cooling becomes 60° C. or more is performed on the liquid adhering surface cooled using the cooling structure.

9. The medium processing device according to claim 1, further comprising:

one or more processors; and one or more memories in which a program executed by the one or more processors is stored, wherein the one or more processors are configured to execute a command of the program, and a temperature after the drying treatment of the medium is adjusted to 90° C. or more and 180° C. or less using the drying device.

10. The medium processing device according to claim 1, wherein the medium is any one of a piece of paper, a resin sheet and a film.

11. A liquid application system comprising:

a liquid application device that applies a liquid to a liquid adhering surface of a medium;

a drying device that performs a drying treatment on the medium having the liquid adhering surface to which the liquid is applied; and a contact member that first comes into contact with the liquid adhering surface of the medium subjected to the drying treatment using the drying device, to which the liquid is adhered, after the drying treatment, wherein the drying device performs the drying treatment on the medium so that a mass of the liquid per unit area on the liquid adhering surface of the medium is 200 micrograms per square centimeter or less, the contact member has a cooling structure that cools the medium, bonding work of a contact surface that comes into contact with the liquid adhering surface with respect to a liquid applied region of the liquid adhering surface of the medium where the liquid is applied is 81 millinewtons per meter or less, and Vickers hardness of the contact surface is 450 Hv or more and 600 Hv or less.

12. The liquid application system according to claim 11, further comprising:

a moisture content adjusting device that is disposed on an upstream side of the liquid application device in a transport direction of the medium and that performs a moisture content adjusting treatment on the medium in a case of entering the liquid application device;

one or more processors; and one or more memories in which a program executed by the one or more processors is stored, wherein the one or more processors are configured to execute a command of the program, and a moisture content of the medium in a case of entering the liquid application device is adjusted to 1.2 percent or more and 14.3 percent or less using the moisture content adjusting device.

13. The liquid application system according to claim 11, further comprising:

a printing device that forms an image on the medium by applying an ink to the medium as the liquid application device, wherein the ink contains wax having a melting point of 90° C. or more.

14. The liquid application system according to claim 11, wherein the medium in entering the liquid application device, is a medium in an untreated state.

* * * * *